Oct. 9, 1923.

F. E. GORDON

TEAPOT AND LIKE VESSEL

Filed March 26, 1923

1,470,224

INVENTOR:
Frank E. Gordon
BY Wm Wallace White
Wallace White
ATTY'S.

Patented Oct. 9, 1923.

1,470,224

UNITED STATES PATENT OFFICE.

FRANK E. GORDON, OF SHEFFIELD, ENGLAND.

TEAPOT AND LIKE VESSEL.

Application filed March 26, 1923. Serial No. 627,850.

*To all whom it may concern:*

Be it known that I, FRANK EDWARD GORDON, a subject of the King of Great Britain, residing at Sheffield, county of York, England, have invented new and useful Improvements in Teapots and like Vessels (for which I have filed application in England Oct. 28, 1921, No. 28,590), of which the following is a specification.

This invention of improvements in or relating to teapots and like vessels refers particularly to strainers for such vessels, the object of the invention being to provide a strainer which may be readily removed when the vessel requires cleaning and as readily replaced and which is very simple in construction and cheaply produced.

According to this invention the strainer comprises a small plate or disc of perforated metal, its size being determined by the opening of the spout into the vessel. This perforated plate is bent or shaped to comply with the form of the body of the vessel and when in use is held close against the body in front of the spout opening at its lower edge by a small clip or flange fixed to the body. A bow shaped handle which is fixed to the back of the strainer is provided with an extension, the top end of which fits sideways into a catch or slide soldered or otherwise secured to the rim of the body or other convenient position in the vessel. The handle is preferably curved so as to give it a slight springiness, and a knob or the like may be attached to the handle to facilitate removal and adjustment.

The invention is illustrated in the annexed sheet of drawings in which:—

Figure 1:
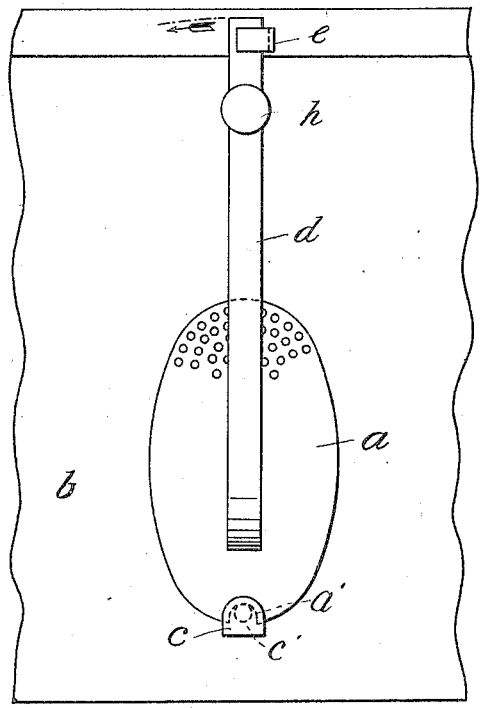
Fig. 1 is an elevation of the strainer in position against the vessel body.
Figure 2:
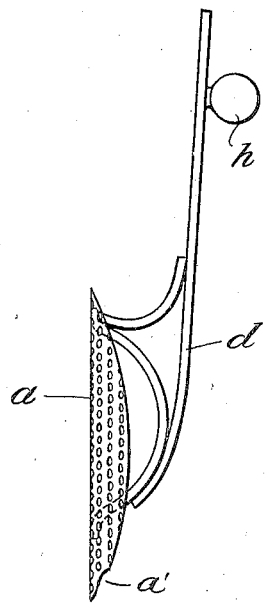
Fig. 2 is a side view of the strainer detached.

Referring to the drawings, the strainer $a$ which is of suitable size and shape to cover and fit against the interior opening into the spout, is held in such position at its base by a turned over flange or clip $c$ open at the top and sides and provided with a horizontal pin $c'$. The strainer $a$ is provided at its lower end with a notch $a'$ which engages over the pin $c'$, whereby the strainer is supported in the clip $c$ and its lower end held against lateral movement in the said clip $c$. A small portion of the vessel body is shown and marked $b$. A bow shaped handle $d$ is secured to the back of the strainer, its top end fitting into a slot or catch $e$ a slight pressure being required to place it in position on account of the shape of the handle. The shape also helps to retain the handle in its position as a certain amount of elasticity is given to it by its formation. A knob $h$ or the like may be fixed on the handle to facilitate its removal.

The strainer may be quickly removed by simply moving the handle sideways from the slot of the catch $e$ and raising it and the interior of the vessel and spout can then be cleaned. The catch $e$ is horizontally disposed and is open at one side and closed at the other side to permit lateral movement of the handle to engage it with the catch $e$ and disengage it therefrom as indicated by the arrow in Figure 1 of the drawing.

My improved strainer is applicable not only to metal teapots but also to earthenware vessels.

Claim:

The combination with a vessel, of a strainer comprising a perforated plate shaped to fit against the spout opening in the vessel, said plate being provided with a handle extending upwardly from the plate to the upper portion of the vessel and the said plate being also provided at the lower end with a notch, a lower clip mounted on the vessel and open at the top and sides and provided with a horizontal pin engaged by the notch of the said plate whereby the strainer is supported by the said clip, and a horizontal catch mounted on the vessel at the upper portion thereof and open at one side and closed at the other and engaging the handle, the latter being adapted to swing into and out of the said catch.

In witness whereof I have hereunto set my hand in presence of a witness.

FRANK E. GORDON.

Witness:

ENSOR D. DRURY.